(12) United States Patent
Akuzawa et al.

(10) Patent No.: US 9,337,665 B2
(45) Date of Patent: May 10, 2016

(54) MULTIPLEXED WIRELESS POWER TRANSMISSION SYSTEM FOR MOVING COMPONENT (71) Applicant: MITSUBISHI ELECTRIC ENGINEERING COMPANY, LIMITED, Tokyo (JP)

(72) Inventors: Yoshiyuki Akuzawa, Tokyo (JP); Yoshiyuki Takahashi, Tokyo (JP)

(73) Assignee: MITSUBISHI ELECTRIC ENGINEERING COMPANY, LIMITED, Tokyo (JP)

( * ) Notice: Subject to any disclaimer, the term of this patent is extended or adjusted under 35 U.S.C. 154(b) by 0 days.

(21) Appl. No.: 14/433,847

(22) PCT Filed: Sep. 2, 2013

(86) PCT No.: PCT/JP2013/073549
§ 371 (c)(1),
(2) Date: Apr. 6, 2015

(87) PCT Pub. No.: WO2014/069092
PCT Pub. Date: May 8, 2014

(65) Prior Publication Data
US 2015/0280447 A1  Oct. 1, 2015

(30) Foreign Application Priority Data

Oct. 31, 2012 (JP) .................... 2012-240760

(51) Int. Cl.
*H02J 17/00* (2006.01)
*H02J 5/00* (2016.01)
*H01F 38/18* (2006.01)

(52) U.S. Cl.
CPC ............... *H02J 5/005* (2013.01); *H01F 38/18* (2013.01); *H02J 17/00* (2013.01)

(58) Field of Classification Search
CPC ......................................................... H02J 17/00
USPC ........................................... 307/104; 320/108
See application file for complete search history.

(56) References Cited

U.S. PATENT DOCUMENTS

| 5,521,444 | A | * | 5/1996 | Foreman | ................. | H01F 38/18 307/104 |
| 2008/0197710 | A1 | * | 8/2008 | Kreitz | ................. | B25J 19/0029 307/104 |
| 2011/0198940 | A1 | | 8/2011 | Urano | | |

FOREIGN PATENT DOCUMENTS

| JP | 1-212416 A | 8/1989 |
| JP | 2005-312285 A | 11/2005 |
| JP | 2011-086890 A | 4/2011 |

*Primary Examiner* — Fritz M Fleming
(74) *Attorney, Agent, or Firm* — Birch, Stewart, Kolasch & Birch, LLP (57) ABSTRACT

A system has primary transmission power supply 1 that supplies power; transmitter-receiver 3 including plural channels of transmitting antennas 5 that wirelessly transmit supplied power and plural channels of receiving antennas 6 that receive power from paired transmitting antennas 5; plural channels of transmission power circuits 2 that establish resonance conditions of paired transmitting antennas 5; and plural channels of receiving power circuits 4 that establish resonance conditions of paired receiving antennas 6. Transmitting antennas 5 have transmitting-side coils 8 approximately centered around the axis of a rotating body or arranged around the axis; and transmitting-side spacers 7 with prescribed permeabilities arranged to control magnetic flux caused by transmitting-side coils 8 for individual channels. Receiving antennas 6 have receiving-side coils 10 placed in the same manner as transmitting-side coils 8; and receiving-side spacers 9 with prescribed permeabilities arranged to control magnetic flux caused by receiving-side coils 10 for individual channels.

21 Claims, 4 Drawing Sheets

MULTIPLEXED WIRELESS POWER TRANSMISSION SYSTEM FOR MOVING COMPONENT

TECHNICAL FIELD

The present invention relates to a multiplexed wireless power transmission system for moving component capable of accomplishing a multiplex transmission function of power by a contactless configuration, which is conventionally carried out via a slip ring device that requires mechanical contacts.

BACKGROUND ART

When connecting a power line to load equipment via a mechanical rotating body, a slip ring device with mechanical contacts has been used conventionally.

The slip ring device comprises slip rings connected to a transmission power supply and disposed on the outer surface of a rotating body via an insulator, and brushes connected to a receiving power supply and having sliding contacts with the outer surfaces of the slip rings. Incidentally, the receiving power supply is connected to load equipment or the like. With the configuration, the slip rings and the brushes are connected electrically, which enables power transfer from the transmission power supply to the receiving power supply. Furthermore, by multiplexing the pairs of the slip rings and brushes in the slip ring device, it can carry out multiplex transmission of plural channels of power.

PRIOR ART DOCUMENT

Patent Document

Patent Document 1: Japanese Patent Laid-Open No. 2005-312285.

DISCLOSURE OF THE INVENTION

Problems to be Solved by the Invention

However, the slip ring device has deterioration due to abrasion at the contacts between the slip rings and brushes which constitute mechanical contacts. Accordingly, it has a problem in that the life of the power transmission system is limited by the deterioration due to abrasion.

On the other hand, a transmission apparatus has been known conventionally which performs noncontact wireless power transmission (see Patent Document 1, for example). A transmission apparatus disclosed in the Patent Document 1 is comprised of plural sets of feeder coils and receiving circuit units including receiving coils paired with the feeder coils, connects rectifier elements to the output side of the individual receiving circuit units, and connects the receiving circuit units including the rectifier elements in parallel to a load. This enables increasing the output because the output currents of the individual receiving circuit units are added while preventing a reverse current across the receiving circuit units.

However, although the Patent Document 1 describes the noncontact wireless power transmission, its main purpose is to increase the transmission power, and hence it simply adds the transmission channels in parallel. Accordingly, the transmission apparatus holds a magnetic field in common between the channels, and has a problem of being unable to implement the multiplex transmission of the power independently from each other. In addition, since the transmission apparatus does not suppose the power transmission via a rotating body, it has a problem of being inapplicable instead of the slip ring device.

The present invention is implemented to solve the foregoing problems. Therefore it is an object of the present invention to provide a multiplexed wireless power transmission system for moving component capable of implementing a multiplex transmission function of power, which has been carried out through a slip ring device, with a contactless configuration.

Means for Solving the Problems

A multiplexed wireless power transmission system for moving component in accordance with the present invention comprises: a primary transmission power supply that supplies power; a transmitter-receiver having plural channels of transmitting antennas that wirelessly transmit the power fed from the primary transmission power supply and plural channels of receiving antennas that receive the power transferred from the transmitting antennas; plural channels of transmission power circuits that establish resonance conditions of paired transmitting antennas; and plural channels of receiving power circuits that establish resonance conditions of paired receiving antennas, wherein the transmitting antennas comprise: transmitting-side coils approximately centered around an axis of the rotating body or placed around the axis; and transmitting-side spacers that have prescribed permeability each, and are approximately centered around the axis of the paired transmitting-side coils so as to control magnetic flux caused by the transmitting-side coils for the individual channels, and wherein the receiving antennas comprise: receiving-side coils approximately centered around the axis of the rotating body or placed around the axis in the same manner as the arrangement of the transmitting-side coils; and receiving-side spacers that have prescribed permeability each, and are approximately centered around the axis of the paired receiving-side coils so as to control magnetic flux caused by the receiving-side coils for the individual channels.

Advantages of the Invention

According to the present invention, since it has the foregoing configuration, it can achieve the multiplex transmission function of the power through the slip ring device with the contactless configuration.

BRIEF DESCRIPTION OF THE DRAWINGS

FIG. 2(a) is a side view of a transmitter-receiver, and FIG. 2(b) is a front view of transmitting antennas and receiving antennas;

FIG. 4(a) is a side view of a transmitter-receiver, and FIG. 4(b) is a front view of the transmitter-receiver;

BEST MODE FOR CARRYING OUT THE INVENTION

The best mode for carrying out the invention will now be described with reference to the accompanying drawings to explain the present invention in more detail.

Embodiment 1

Figure 1:
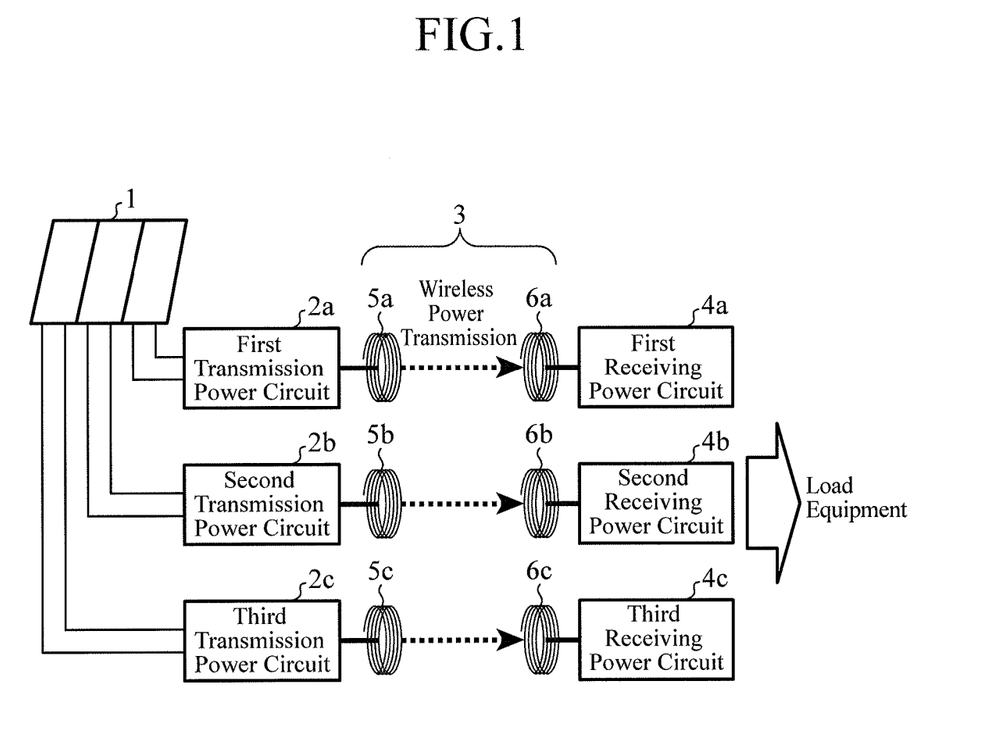
FIG. 1 is a schematic diagram showing a configuration of a multiplexed wireless power transmission system for moving component of an embodiment 1 in accordance with the present invention.

FIG. 1 is a schematic diagram showing a configuration of a multiplexed wireless power transmission system for moving component of an embodiment 1 in accordance with the present invention.

The multiplexed wireless power transmission system for moving component, which is used for connecting a power line to load equipment or the like (not shown) via a mechanical rotating body (not shown), is an apparatus that carries out wireless transmission of plural channels of power including an electrical signal in parallel. The multiplexed wireless power transmission system for moving component comprises as shown in FIG. 1 a primary transmission power supply 1, transmission power circuits 2, a transmitter-receiver 3 and receiving power circuits 4. The transmitter-receiver 3 comprises transmitting antennas 5 and receiving antennas 6. Then to carry out multiplex transmission, the movable component multiplexed transmission system comprises a plurality of channels of the transmission power circuits 2, transmitting antennas 5, receiving antennas 6 and receiving power circuits 4 (FIG. 1 shows an example having three channels, which are designated by suffixes a-c added to the individual components).

The primary transmission power supply 1 supplies prescribed power to the individual transmitting antennas 5 via the individual transmission power circuits 2.

The transmission power circuits 2 is disposed between the primary transmission power supply 1 and the transmitting antennas 5 to establish resonance conditions of the paired transmitting antennas 5 through resonance impedance control.

The transmitting antennas 5 wirelessly transmit the power fed from the primary transmission power supply 1 via the paired transmission power circuits 2 to the receiving antennas 6. As for the structure of the transmitting antennas 5, it will be described in more detail later.

The receiving antennas 6 receive the power from the paired transmitting antennas 5. The power received with the receiving antennas 6 is supplied to the load equipment and the like via the receiving power circuits 4. As for the structure of the receiving antennas 6, it will be described in more detail later.

The receiving power circuits 4 are disposed between the receiving antennas 6 and the load equipment and the like to establish resonance conditions of the paired receiving antennas 6 through input impedance control.

Incidentally, the wireless transmission method of the transmitter-receiver 3 is not specifically limited, but can use any one of the method based on magnetic resonance, method based on electric-field resonance, and method based on electromagnetic induction.

Figure 2:
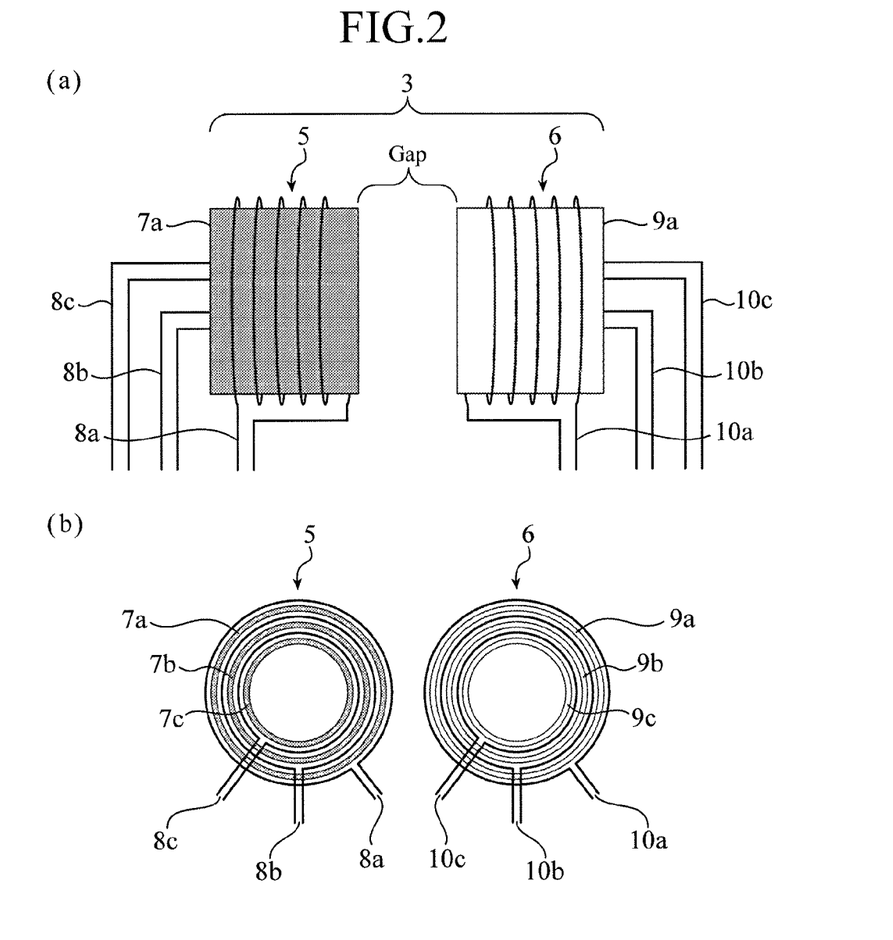
FIG. 2 is a schematic diagram showing a configuration of a transmitter-receiver in the embodiment 1 in accordance with the present invention.
Figure 3:
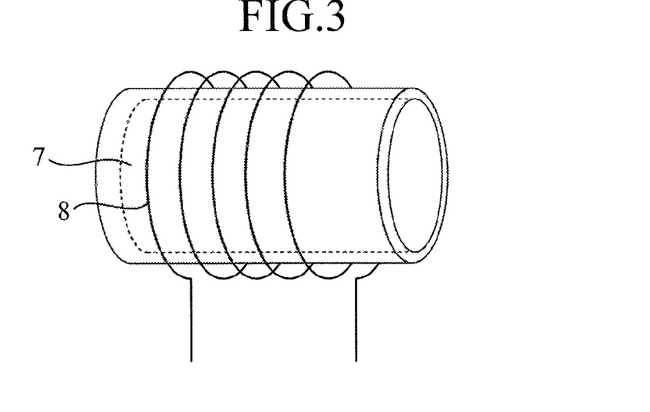
FIG. 3 is a perspective view showing a structure of a single transmitting antenna of the embodiment 1 in accordance with the present invention.

Next, a configuration of the transmitter-receiver 3 will be described with reference to FIG. 2 and FIG. 3. FIG. 2 is a schematic diagram showing a configuration of the transmitter-receiver 3 of the present embodiment 1 in accordance with the present invention: FIG. 2(a) is a side view of the transmitter-receiver 3; and FIG. 2(b) is a front view of the transmitting antennas 5 and receiving antennas 6. In addition, FIG. 3 is a perspective view showing a structure of a single transmitting antenna 5. Although FIG. 3 shows the transmitting antenna 5, the receiving antenna 6 has a similar structure.

As shown in FIG. 2(a), the transmitter-receiver 3 has the individual transmitting antennas 5 and the individual receiving antennas 6 facing to each other via a prescribed gap.

As shown in FIG. 2 and FIG. 3, the transmitting antennas 5 comprise transmitting-side spacers 7 and transmitting coils 8. In the same manner, the receiving antennas 6 comprise receiving-side spacers 9 and receiving coils 10.

Incidentally, FIG. 2 shows an example in which the transmitter-receiver 3 has three channels which are designated by suffixes a-c added to the individual components.

The transmitting-side coils 8 are approximately centered around the axis of the rotating body or disposed around the axis. In the embodiment 1, the individual transmitting-side coils 8 have a different diameter each, and are approximately centered around the axis of the rotating body concentrically one over another via prescribed gaps.

The transmitting-side spacers 7 are approximately centered around the axis of the paired transmitting-side coils 8 and are comprised of a material with prescribed permeability so as to control the magnetic flux caused by the individual transmitting-side coils 8 independently for each of the channels. In the embodiment 1, the individual transmitting-side spacers 7 are hollow spacers with different diameters (referred to as transmitting-side hollow spacers 7 from now on), and are placed concentrically one over another via prescribed gaps.

The receiving-side coils 10, which are arranged in the same manner as the transmitting-side coils 8, are approximately centered around the axis of the rotating body or disposed around the axis. In the embodiment 1, the individual receiving-side coils 10 have a different diameter each, and are approximately centered around the axis of the rotating body concentrically one over another via prescribed gaps.

The receiving-side spacers 9 are approximately centered around the axis of the paired receiving-side coils 10 and are comprised of a material with prescribed permeability so as to control the magnetic flux caused by the receiving-side coils 10 independently for each of the channels. In the embodiment 1, the individual receiving-side spacers 9 are hollow spacers with different diameters (referred to as receiving-side hollow spacers 9 from now on), and are placed concentrically one over another via prescribed gaps.

Incidentally, as for the configuration shown in FIG. 2 (in which the transmitting antennas 5 and the receiving antennas 6 are placed face to face with each other), the permeability of the individual transmitting-side hollow spacers 7 and that of the individual receiving-side hollow spacers 9 can all be identical. In this case, however, the transmission efficiency deteriorates. Accordingly, if it is necessary to consider the transmission efficiency, it is better that the permeability between the adjacent transmitting-side hollow spacers 7 and the permeability between the adjacent receiving-side hollow spacers 9 differ from each other. For example, in FIG. 2, the relative permeability of the first transmitting-side hollow spacer 7a and that of the first receiving-side hollow spacer 9a are made 2500, the relative permeability of the second transmitting-side hollow spacer 7b and that of the second receiving-side hollow spacer 9b are made 250, and the relative permeability of the third transmitting-side hollow spacer 7c and that of the third receiving-side hollow spacer 9c are made 25.

In this way, using the spacers 7 and 9 with the prescribed permeabilities enables controlling the magnetic flux across the coils 8 and 10, thereby being able to optimize the coupling magnetic flux. Accordingly, the multiplex transmission using the wireless power transmission becomes possible.

As described above, according to the present embodiment 1, since it is configured in such a manner that the individual transmitting-side coils 8 are approximately centered around the axis of the rotating body so as to be arranged concentrically one over another via the gaps; the individual receiving-side coils 10 are disposed face to face with the paired transmitting-side coils 8 via the gap so as to be arranged concentrically one over another via the gaps; and the magnetic flux across the coils 8 and 10 is controlled by the spacers 7 and 9. Accordingly, it can implement the multiplex transmission of the power through the slip ring device by a contactless configuration. As a result, it can remove the life limit because of the deterioration of the mechanical contacts due to abrasion, thereby being able to prolong the life of the apparatus. In addition, since the wireless power transmission can prevent a bad connection due to contamination or a leakage due to dew condensation, it can improve the reliability of the apparatus. Furthermore, since it can prevent a spark that can occur owing to abrasion of mechanical contacts, it can operate in a flammable gas or liquid.

Incidentally, in the example shown in FIG. 2, the transmitting-side coil 8a is wound exposedly on the outer surface of the outermost transmitting-side hollow spacer 7a on the transmitting antenna 5 side. In contrast with this, a configuration is also possible which further comprises a hollow spacer placed around the transmitting-side coil 8a concentrically one over another via a prescribed gap. Thus, the hollow spacer functions as a shielding material and can prevent a magnetic flux leakage to the outside. A similar configuration is possible for the receiving antenna 6 side as well.

Embodiment 2

The embodiment 1 shows a configuration in which the transmitting antennas 5 and the receiving antennas 6 are placed face to face with each other separately. In contrast with this, the embodiment 2 shows an example in which the transmitting antennas 5 and the receiving antennas 6 are fitted into a unit.

Incidentally, since the multiplexed wireless power transmission system for moving component of the embodiment 2 has the same configuration as the multiplexed wireless power transmission system for moving component of the embodiment 1 shown in FIG. 1, its description will be omitted.

Figure 4:
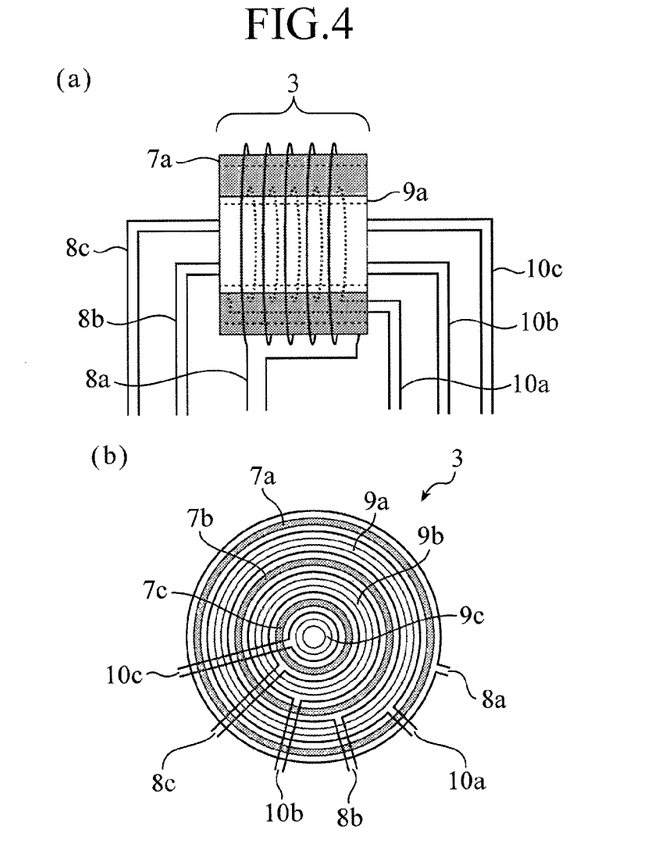
FIG. 4 is a schematic diagram showing a configuration of a transmitter-receiver of an embodiment 2 in accordance with the present invention.
Figure 5:
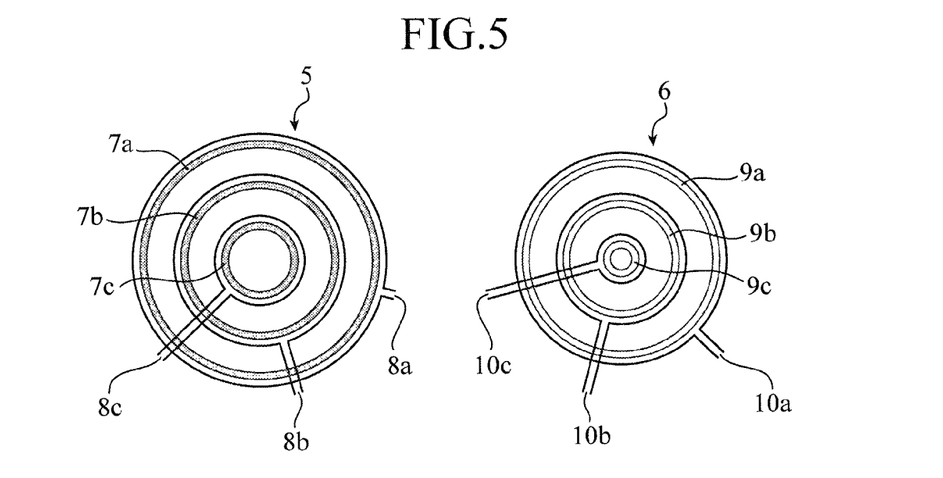
FIG. 5 is a front view showing a structure of transmitting antennas and receiving antennas of the embodiment 2 in accordance with the present invention.

A configuration of the transmitter-receiver 3 will be described with reference to FIG. 4 and FIG. 5. FIG. 4 is a schematic diagram showing a configuration of the transmitter-receiver 3 in the present embodiment 2 in accordance with the present invention: FIG. 4(a) is a side view of the transmitter-receiver 3; and FIG. 4(b) is a front view of the transmitter-receiver 3. In addition, FIG. 5 is a front view of the transmitting antennas 5 and the receiving antennas 6. Incidentally, in the example of FIG. 4 and FIG. 5, the transmitter-receiver 3 has three channels, and suffixes a-c are added to the individual components of the channels.

As shown in FIG. 4, the transmitter-receiver 3 in the embodiment 2 has the individual transmitting antennas 5 and the individual receiving antennas 6 fitted into each other. More specifically, as shown in FIG. 4(b), the individual transmitting-side coils 8 are approximately centered around the axis of the rotating body and are placed concentrically one over another via prescribed gaps. In addition, the individual receiving-side coils 10 are arranged one over another inside and adjacently to the paired transmitting-side coils 8 via prescribed gaps.

Incidentally, as shown in FIG. 5, the receiving antennas 6 are made smaller in diameter than the transmitting antennas 5 so that they are disposed inside the paired transmitting antennas 5.

Incidentally, as for the configuration shown in FIG. 4 (in which the transmitting antennas 5 and the receiving antennas 6 are fitted into each other), it is necessary to vary the permeabilities of the paired transmitting-side hollow spacers 7 and receiving-side hollow spacers 9. For example, in FIG. 4, the permeability of the first to third transmitting-side hollow spacers 7a-7c is made $4\pi*10^{-7}$, and the relative permeability of the first receiving-side hollow spacer 9a is made 2500, the relative permeability of the second receiving-side hollow spacer 9b is made 250, and the relative permeability of the third receiving-side hollow spacer 9c is made 25.

As described above, according to the present embodiment 2, it is configured in such a manner that the individual transmitting-side coils 8 are approximately centered around the axis of the rotating body so as to be arranged concentrically one over another via the gaps, the individual receiving-side coils 10 are arranged concentrically and adjacently to the paired transmitting-side coils 8 one over another via the gaps, and the permeabilities of the paired transmitting-side hollow spacers 7 and receiving-side hollow spacers 9 are varied. The configuration can also achieve the same advantages as the embodiment 1.

Incidentally, in the example shown in FIG. 4, the transmitting-side coil 8a is wound exposedly on the outer surface of the outermost transmitting-side hollow spacer 7a. In contrast with this, a hollow spacer can be placed concentrically outside the transmitting-side coil 8a one over another via a prescribed gap. This enables the hollow spacer to function as a shielding material, thereby being able to prevent a magnetic flux leakage to the outside. In addition, it is also possible for the couple of the hollow spacer and the adjacent transmitting-side hollow spacer 7a to control the magnetic flux.

In addition, the example in FIG. 4 and FIG. 5 shows the case where the receiving antennas 6 have smaller diameters than the paired transmitting antennas 5. On the contrary, the transmitting antennas 5 can have smaller diameters than the paired receiving antennas 6.

Embodiment 3

The embodiments 1 and 2 show examples that use the circular coils 5 and 6 as the coils, and place them concentrically one over another. In contrast with this, the embodiment 3 shows an example that uses coils with any desired shape, and arranges a plurality of such coils around a rotating body 20. The following description will be made by way of example that employs elliptical coils 8 and 10.

Incidentally, as for the configuration of the multiplexed wireless power transmission system for moving component of the embodiment 3, since it is the same as that of the multiplexed wireless power transmission system for moving component of the embodiment 1 shown in FIG. 1, the description thereof will be omitted.

Figure 6:
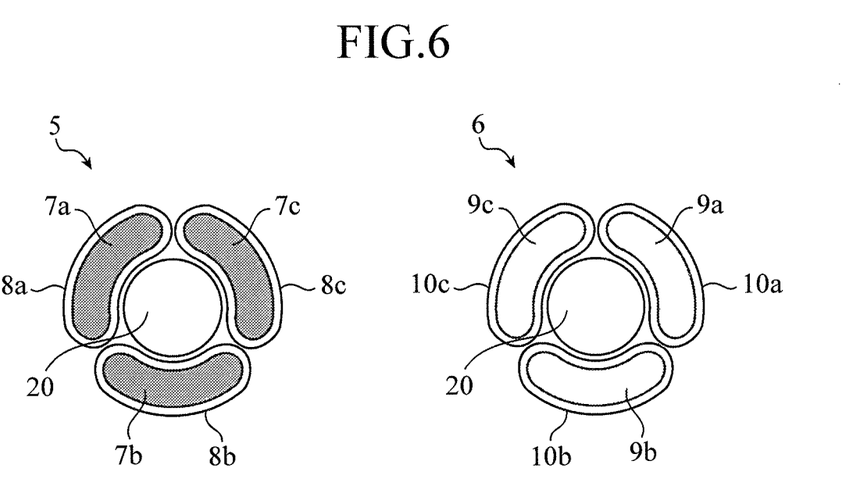
FIG. 6 is a front view showing a structure of transmitting antennas and receiving antennas of an embodiment 3 in accordance with the present invention.

A configuration of the transmitter-receiver 3 will be described with reference to FIG. 6. FIG. 6 is a front view showing a configuration of the transmitting antennas 5 and the receiving antennas 6 of the present embodiment 3 in accordance with the present invention. Incidentally, FIG. 6 shows an example in which the transmitter-receiver 3 (transmitting antennas 5 and receiving antennas 6) has three channels, and suffixes a-c are added to their individual components.

The transmitter-receiver 3 of the embodiment 3 has the individual transmitting antennas 5 and individual receiving antennas 6 arranged face to face via a prescribed gap.

As shown in FIG. 6, the transmitting-side coils 8 are shaped like an ellipse, and are disposed along the outer circumference (around the axis) of the rotating body 20. Likewise, the receiving-side coils 10 are shaped like an ellipse, and are arranged face to face with the paired transmitting-side coils 8 along an outer circumference of the rotating body 20.

Here, the reason for shaping the transmitting-side coils 8 and receiving-side coils 10 in an ellipse is to gain time of sharing the magnetic flux across the paired coils 8 and 10 while the transmitting-side coils 8 and receiving-side coils 10 rotate with the rotation of the rotating body 20. More specifically, since the transmitting antennas 5 and the receiving antennas 6 do not rotate synchronously, the magnetic flux across the paired coils 8 and 10 cannot be shared always. For example, the first transmitting-side coil 8$a$ and the first receiving-side coil 10$a$ do not always face to each other, but there are some times in which the first transmitting-side coil 8$a$ faces the second receiving-side coil 10$b$. Accordingly, the present configuration is considered to be effective when the transmission destination of the power is not distinguished depending on the channels.

Incidentally, as for the configuration shown in FIG. 6 (which employs the coils 8 and 10 with any desired shape and disposes the transmitting antennas 5 and receiving antennas 6 face to face with each other), the relative permeability of the individual transmitting-side spacers 7 and that of the individual receiving-side spacers 9 can be all equal. For example, in FIG. 6, the relative permeability of the first to third transmitting-side spacers 7$a$-7$c$ and the first to third receiving-side spacers 9$a$-9$c$ are made 1000. In this case, however, the transmission efficiency deteriorates. Accordingly, if it is necessary to consider the transmission efficiency, it is better to vary the permeabilities between the adjacent transmitting-side spacers 7 and between the adjacent receiving-side spacers 9.

As described above, according to the present embodiment 3, it is configured in such a manner that the transmitting-side coils 8 with any desired shape are disposed along the outer circumference of the rotating body 20, and that the receiving-side coils 10 with any desired shape are disposed face to face with the paired transmitting-side coils 8 via the gap. Accordingly, in addition to the advantages of the embodiment 1, the present embodiment 3 can simplify its structure as compared with the embodiment 1, thereby being able to reduce its cost.

Incidentally, in the example shown in FIG. 6, the transmitting-side coils 8$a$-8$c$ are wound exposedly on the outer surfaces of the individual transmitting-side hollow spacers 7$a$-7$c$ at the transmitting antenna 5 side. In contrast with this, a configuration is also possible which further comprises a hollow spacer placed around them via a prescribed gap. Thus, the hollow spacer functions as a shielding material and can prevent a magnetic flux leakage to the outside. A similar configuration is possible for the receiving antenna 6 side as well.

Incidentally, although the example in FIG. 6 is described using an example that disposes the transmitter-receiver 3 (transmitting antennas 5 and receiving antennas 6) on the outer circumference of the rotating body 20, this is not essential. For example, a configuration is also possible in which the transmitter-receiver 3 is disposed inside the hollow rotating body 20.

Embodiment 4

The embodiments 1 and 2 show the examples in which the plural channels of transmitting antennas 5 and receiving antennas 6 are placed concentrically one over another. In contrast with this, the embodiment 4 shows an example comprising a series connection of a plurality of channels, each of which has a single channel of the transmitting antenna 5 and the receiving antenna 6 fitted to each other.

Incidentally, as for the configuration of the multiplexed wireless power transmission system for moving component of the embodiment 4, since it is the same as that of the multiplexed wireless power transmission system for moving component of the embodiment 1 shown in FIG. 1, the description thereof will be omitted.

Figure 7:
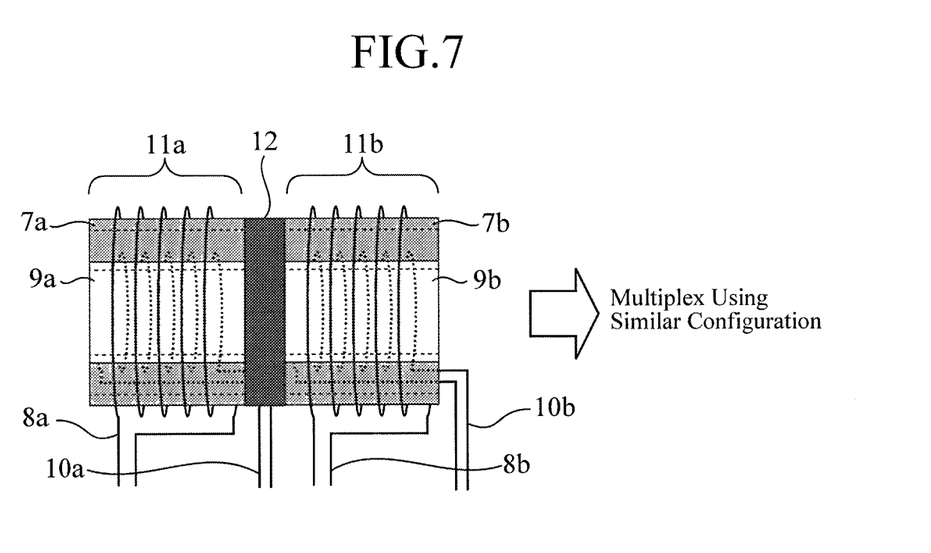
FIG. 7 is a side view showing a configuration of a transmitter-receiver of an embodiment 4 in accordance with the present invention.

The configuration of the transmitter-receiver 3 will be described with reference to FIG. 7. FIG. 7 is a side view showing the configuration of the transmitter-receiver 3 of the present embodiment 4 in accordance with the present invention. Incidentally, in the example of FIG. 7, the transmitter-receiver 3 has two channels, and the suffixes a and b are added to the individual components.

As shown in FIG. 7, the transmitter-receiver 3 in the embodiment 4 comprises a plurality of fitting sections 11 and a connecting hollow spacer 12.

Each fitting section 11 has a single channel of the transmitting antenna 5 and the receiving antenna 6 fitted to each other. Incidentally, since the fitting structure is the same as that of the embodiment 2, its description will be omitted here.

The connecting hollow spacer 12 is comprised of a material with permeability less than the permeability of the transmitting-side hollow spacers 7 and the receiving-side hollow spacers 9 of the fitting sections 11 adjacent to the connecting hollow spacer 12 along approximately the same axis, and connects the adjacent fitting sections 11 in series.

Here, as shown in FIG. 7, the first transmitting-side hollow spacer 7$a$ on which the first transmitting-side coil 8$a$ is wound and the first receiving-side hollow spacer 9$a$ on which the first receiving-side coil 10$a$ is wound constitute the first fitting section 11$a$. Likewise, the second transmitting-side hollow spacer 7$b$ on which the second transmitting-side coil 8$b$ is wound and the second receiving-side hollow spacer 9$b$ on which the second receiving-side coil 10$b$ is wound constitute the second fitting section 11$b$.

Then, the first fitting section 11$a$ and the second fitting section 11$b$ are connected in series via the connecting hollow spacer 12. This enables preventing the common use of the magnetic flux between the adjacent first fitting section 11$a$ and second fitting section 11$b$. In addition, although FIG. 7 shows the series connection of the two channels, a plurality of channels can be multiplexed by connecting a plurality of fitting sections 31 in series in the same manner.

Incidentally, in the configuration shown in FIG. 7 (which has a series connection of the transmitting antennas 5 and the receiving antennas 6, each couple of which are fitted to each other), for example, the permeability of the first and second transmitting-side hollow spacers 7$a$ and 7$b$ is made $4\pi*10^{-7}$, the relative permeability of the first and second receiving-side hollow spacers 9$a$ and 9$b$ is made 1000, and the permeability of the connecting hollow spacer 12 is made $4\pi*10^{-7}$.

As described above, according to the present embodiment 4, it is configured in such a manner as to comprise the plurality of fitting sections 11 each of which has a single channel transmitting antenna 5 and receiving antenna 6; and the connecting hollow spacer 12 that is comprised of a material with permeability not greater than the permeability of the transmitting-side spacers 7 and receiving-side spacers 9 of the fitting sections 11 adjacent to each other along approximately the same axis, and that connects the adjacent fitting sections 11 in series. Accordingly, in addition to the advantages of the embodiment 1, it can simplify the configuration as compared with the embodiment 1, thereby being able to reduce the cost. In addition, it can reduce the diameter of the transmitter-receiver 3 as compared with the embodiment 2, thereby enabling the space-saving.

Incidentally, in the example shown in FIG. 7, the transmitting-side coils 8a and 8b are wound exposedly on the outer surface of the outermost transmitting-side hollow spacers 7a and 7b. In contrast with this, hollow spacers can be placed concentrically over the outside of the transmitting-side coils 8a and 8b via a prescribed gap. This enables the hollow spacers to function as a shielding material, thereby being able to prevent a magnetic flux leakage to the outside. In addition, it is also possible for the couple of one of the hollow spacers and the adjacent transmitting-side hollow spacer 7a or 7b to control the magnetic flux.

In addition, the embodiment 4 shows the example in which the fitting sections 11, each of which has a single channel transmitting antenna 5 and receiving antenna 6 fitted to each other, are connected in series. In contrast with this, by combining the embodiment 4 with the embodiment 2, a configuration is also possible in which the fitting sections 11, each of which has two or more channels of the transmitting antennas 5 and receiving antennas 6 fitted to each other, are connected in series.

In addition, although the example shown in FIG. 7 shows the configuration in which the receiving antenna 6 has a diameter smaller than the paired transmitting antenna 5, the transmitting antenna 5 can have a diameter smaller than the paired receiving antenna 6 on the contrary.

In addition, as for the transmitter-receiver 3 shown in the embodiments 1, 2 or 4, it can be placed on the outer circumference of the rotating body, or inside a hollow rotating body. Incidentally, when the transmitter-receiver 3 is placed inside the rotating body, the spacers 7 and 9 placed at the innermost part of the transmitter-receiver 3 cannot be hollow.

In addition, although the embodiments 1-4 show the configurations in which the transmitting antennas 5 and receiving antennas 6 are each comprised of a single coil (transmitting-side coil 8 and receiving-side coil 10), this is not essential. For example, a configuration is also possible in which the coils 8 and 10 are each comprised of a feed coil and a resonance coil, or comprised of two or more coils.

In addition, as for the power the primary transmission power supply 1 feeds to the individual transmitting antennas 5 in the embodiments 1-4, it can be the same frequency for the channels, or can be different frequencies. Incidentally, when the frequencies vary for the individual channels, the resonance conditions of the transmitting antenna 5 and receiving antenna 6 vary for each channels.

In addition, the resonance conditions of the receiving antennas 6 vary depending on the distance between it and the paired transmitting antennas 5, and depending on the load current/load impedance. Accordingly, the receiving-side circuits 4 can have an additional function of varying the resonance conditions to be met with respect to the receiving antennas 6 in accordance with the variations of such transmission states. Likewise, the transmit side circuit 2 can have an additional function of varying the resonance conditions of the transmitting antennas 5. Furthermore, both the circuits 2 and 4 can have the additional function of varying the resonance conditions of the individual antennas 5 and 6.

Incidentally, it is to be understood that a free combination of the individual embodiments, variations of any components of the individual embodiments or removal of any components of the individual embodiments is possible within the scope of the present invention.

INDUSTRIAL APPLICABILITY

A multiplexed wireless power transmission system for moving component in accordance with the present invention is configured in such a manner that it has the individual transmitting-side coils approximately centered around the axis of the rotating body one over another via the individual gaps, has the individual receiving-side coils placed face to face with the paired transmitting-side coils and arranged one over another via the gaps, and controls the magnetic flux across the coils via the spacers, thereby being able to implement the multiplex transmission function of the power through the slip ring device with the contactless configuration. Accordingly, it is suitable for an application to a power transmission system that carries out multiplex transmission of the plural channels of power.

DESCRIPTION OF REFERENCE SYMBOLS

1 primary transmission power supply; 2, 2a-2c transmission power circuit; 3 transmitter-receiver; 4, 4a-4c receiving power circuit; 5, 5a-5c transmitting antenna; 6, 6a-6c receiving antenna; 7, 7a-7c transmitting-side spacer (transmitting-side hollow spacer); 8, 8a-8c transmitting-side coil; 9, 9a-9c receiving-side spacer (receiving-side hollow spacer); 10, 10a-10c receiving-side coil; 11, 11a, 11b fitting section; 12 connecting hollow spacer; 20 rotating body.

What is claimed is:

1. A multiplexed wireless power transmission system for moving component via a rotating body, the multiplexed wireless power transmission system for moving component comprising:
   a primary transmission power supply that supplies power;
   a transmitter-receiver having plural channels of transmitting antennas that wirelessly transmit the power fed from the primary transmission power supply and plural channels of receiving antennas that receive the power transferred from the transmitting antennas;
   plural channels of transmission power circuits that establish resonance conditions of paired transmitting antennas; and
   plural channels of receiving power circuits that establish resonance conditions of paired receiving antennas, wherein
   the transmitting antennas comprise:
       transmitting-side coils approximately centered around an axis of the rotating body or placed around the axis; and
       transmitting-side spacers that have prescribed permeability each, and are approximately centered around the axis of the paired transmitting-side coils so as to control magnetic flux caused by the transmitting-side coils for the individual channels, and wherein
   the receiving antennas comprise:
       receiving-side coils approximately centered around the axis of the rotating body or placed around the axis in the same manner as the arrangement of the transmitting-side coils; and
       receiving-side spacers that have prescribed permeability each, and are approximately centered around the axis of the paired receiving-side coils so as to control magnetic flux caused by the receiving-side coils for the individual channels.

2. The multiplexed wireless power transmission system for moving component according to claim 1, wherein
the transmitting-side coils have a different diameter each, and are approximately centered around the axis of the rotating body one over another via gaps; and
the receiving-side coils have a different diameter each, and are disposed face to face with the paired transmitting-side coils via a gap so as to be arranged concentrically one over another via gaps.

3. The multiplexed wireless power transmission system for moving component according to claim 1, wherein
the transmitting-side coils have a different diameter each, and are approximately centered around the axis of the rotating body one over another via gaps; and
the receiving-side coils have a different diameter each, and are arranged adjacently to the paired transmitting-side coils one over another via gaps.

4. The multiplexed wireless power transmission system for moving component according to claim 1, wherein
the transmitting-side coils are formed in any desired shape, and are placed around the axis of the rotating body; and
the receiving-side coils are formed in any desired shape, and are placed face to face with the paired transmitting-side coils via a gap.

5. The multiplexed wireless power transmission system for moving component according to claim 1, wherein
the transmitter-receiver comprises:
a plurality of fitting sections, each of which has one or more channels of the transmitting antennas and the receiving antennas fitted into each other; and
a connecting hollow spacer that is comprised of a material with permeability less than the permeability of the transmitting-side spacers and the receiving-side spacers in the adjacent fitting sections which are approximately placed along the same axis, and that connects the adjacent fitting sections in series, and wherein
the transmitting-side coils are approximately centered around the axis of the rotating body;
the receiving-side coils are placed adjacently to the paired transmitting-side coils one over another via gaps; and
the paired transmitting-side spacers and receiving-side spacers have different permeabilities.

6. The multiplexed wireless power transmission system for moving component according to claim 5, wherein
the transmitter-receiver further comprises a hollow spacer that covers the outermost transmitting-side spacer and/or receiving-side spacer via a gap.

7. The multiplexed wireless power transmission system for moving component according to claim 5, wherein
the transmitter-receiver carries out wireless transmission using magnetic resonance.

8. The multiplexed wireless power transmission system for moving component according to claim 5, wherein
the transmitter-receiver carries out wireless transmission using electric-field resonance.

9. The multiplexed wireless power transmission system for moving component according to claim 5, wherein
the transmitter-receiver carries out wireless transmission using electromagnetic induction.

10. The multiplexed wireless power transmission system for moving component according to claim 5, wherein
the transmitting-side coils and the receiving-side coils are each comprised of two or more coils.

11. The multiplexed wireless power transmission system for moving component according to claim 5, wherein
the primary transmission power supply supplies the individual transmitting antennas with power with different frequencies.

12. The multiplexed wireless power transmission system for moving component according to claim 5, wherein
the receiving power circuits vary the resonance conditions of the receiving antennas in accordance with a transmission state of the receiving antennas.

13. The multiplexed wireless power transmission system for moving component according to claim 5, wherein
the transmission power circuits vary the resonance conditions of the transmitting antennas in accordance with a transmission state of the transmitting antennas.

14. The multiplexed wireless power transmission system for moving component according to claim 1, wherein
the transmitter-receiver further comprises a hollow spacer that covers the outermost transmitting-side spacer and/or receiving-side spacer via a gap.

15. The multiplexed wireless power transmission system for moving component according to claim 1, wherein
the transmitter-receiver carries out wireless transmission using magnetic resonance.

16. The multiplexed wireless power transmission system for moving component according to claim 1, wherein
the transmitter-receiver carries out wireless transmission using electric-field resonance.

17. The multiplexed wireless power transmission system for moving component according to claim 1, wherein
the transmitter-receiver carries out wireless transmission using electromagnetic induction.

18. The multiplexed wireless power transmission system for moving component according to claim 1, wherein
the transmitting-side coils and the receiving-side coils are each comprised of two or more coils.

19. The multiplexed wireless power transmission system for moving component according to claim 1, wherein
the primary transmission power supply supplies the individual transmitting antennas with power with different frequencies.

20. The multiplexed wireless power transmission system for moving component according to claim 1, wherein
the receiving power circuits vary the resonance conditions of the receiving antennas in accordance with a transmission state of the receiving antennas.

21. The multiplexed wireless power transmission system for moving component according to claim 1, wherein
the transmission power circuits vary the resonance conditions of the transmitting antennas in accordance with a transmission state of the transmitting antennas.

* * * * *